United States Patent Office 3,329,566
Patented July 4, 1967

3,329,566
PROCESS FOR SEPARATING NEOMYCIN B FROM NEOMYCIN C
Seemon H. Pines, Lewisburg, Pa., assignor to Merck & Co., Inc., Rahway, N.J., a corporation of New Jersey
No Drawing. Filed June 10, 1963, Ser. No. 286,525
3 Claims. (Cl. 167—65)

This invention relates to a process for the preparation of neomycin suitable for pharmaceutical use. More particularly, this invention is directed to a process for separating mixtures of neomycin B, the most desirable antibiotic for pharmaceutical use, from aqueous mixtures containing substantial amounts of neomycin C admixed with neomycin B.

Neomycin is a mixture of antibiotics produced by cultures of Streptomyces fradiae and is composed of at least three closely related antibiotic substances. These substances have been isolated and identified as neomycin A, neomycin B and neomycin C. Neomycin A occurs in the fermentation liquors, usually in relatively small quantities, and is reasonably simple to eliminate from mixtures with neomycin B and C by conventional crystallization procedures. The neomycin B component, which is very similar in structure to neomycin C, is the compound of choice having the best therapeutic activity combined with the lowest toxicity.

The chemical structure of the neomycins A, B and C has been defined by the following formula, insofar as it is known:

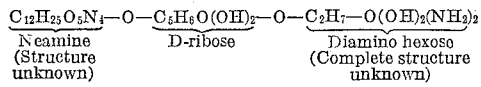

| $C_{12}H_{25}O_5N_4$—O— | $C_5H_6O(OH)_2$—O— | $C_2H_7$—O$(OH)_2(NH_2)_2$ |
|---|---|---|
| Neamine (Structure unknown) | D-ribose | Diamino hexose (Complete structure unknown) |

Neomycin A is identical to the neamine moiety of the above structure. The structures of neomycin B and C are identical and correspond to the entire formula except for the structure of the diamino hexose component. In view of this extremely close chemical similarity, it is very difficult to separate the components neomycin B and C by the ordinary physical methods of purification, i.e., crystallization or extraction, which are used in large commercial-scale operations.

It is an object of the present invention to separate the desired neomycin B component from mixtures of neomycin B and neomycin C by methods which are adaptable to factory-scale operations.

It is a further object of the present invention to isolate neomycin B from mixtures of neomycin B and C in relatively pure form suitable for pharmaceutical use.

In accordance with my invention, it has now been found that these and other objects may be attained by the chromatographic separation of neomycin B from aqueous mixtures containing both neomycin B and C. In operating this chromatographic separation process, aqueous mixtures of neomycin B and C obtained from fermentation broth are percolated through a column containing a porous, strong base anion exchange resin. The resin column containing neomycin B and C is then developed using an aqueous solution as the developing solvent. Under these conditions, neomycin C and neomycin B are eluted from the column separately, neomcyin C being preferentially eluted in the first eluate fractions. By collecting small fractions of the eluate, it is possible to separate the desired neomycin B from the unwanted neomycin C.

The neomycin used as starting material in the process of my invention is obtained as a crude material resulting from the fermentation of a neomycin-producing strain of microorganisms. The crude antibiotic may be further purified, if desired, by adsorption from the fermentation broth on a cation exchange resin and elution of the adsorbed neomycin mixture. This neomycin eluate is decolorized using a strongly basic anion exchange resin, decolorizing carbon, or a combination thereof, and concentrated to a suitable solids content.

In the process of my invention, the unique and novel feature is that solutions of neomycin B and C which are not separable by ordinary physical purification processes such as crystallization can be chromatographically separated on a strongly basic anion exchange resin of the quaternary amine type.

In accordance with one embodiment of my invention, an aqueous solution of a mixture of neomycin B and C having a concentration of from about 0.1 to 0.4 gram of mixed neomycin bases per ml. of solution is percolated slowly through a column of a loosely cross-linked quaternary amine-type resin and subsequently developed with water or dilute aqueous ammonia solutions.

The feed material for the column may be the above-described concentrated decolorized eluate or a solution prepared from a mixture of solid neomycin B and C sulfates. The concentration of the solution used as feed material is between 100 and 400 mg. of neomycin base per ml. of solution and, preferably, approximately 250 mg. of neomycin base per ml. of solution. In addition, the solution should be reasonably free of extraneous salts and colored impurities which will interfere with the chromatographic process. An examination of the resin loading of neomycin indicates that separations become more difficult as loading increases. Loading levels varying between 24 and 120 grams of mixed neomycin bases per gallon of resin may be employed. However, the preferable loading level is on the order of about 70 grams of neomycin base per gallon of resin, in which case consistently satisfactory results are obtained.

The resins which are generally operative in the chromatographic separation process of my invention are strongly basic anion exchange resins. The resins operative in the process of my invention are of the polystyrene quaternary ammonium type, typical examples of which are the "Amberlite IR401" obtainable from the Rohm & Haas Company of Philadelphia, Pa., and the "Dowex 1-X2" available from the Dow Chemical Company, Midland, Mich. The mesh size of the resin is important; more satisfactory results are obtained from the finer resins. It is generally preferred to use resins having a particle size between 50–100 mesh. The degree of cross-linking is important and should not exceed about 4%. All of the resins are used on the hydroxyl cycle.

As solvents for the elution of the neomycin adsorbed on the resin column, water or aqueous solutions of a volatile amine may be employed. The preferred solvent is water, since solutions of volatile amines such as ammonia appear to offer no significant advantages in concentrating the eluted bands of neomycin B and neomycin C.

The rate at which the elution is carried out is important to the separation of the two neomycin components. Although the rate is not sharply critical, a very rapid elution rate tends to diminish the amount of separation in the column and create "tailing" of the chromatographic bands. An extremely slow elution rate, although possibly theoretically ideal, is undesirable because of the long time involved in carrying out the elution of the column. Ordinarily, an elution rate in the range of from about 0.5 to about 1.5 mls. per minute per cm.$^2$ is satisfactory, the optimum rate being approximately 1.2 ml. per minute per cm.$^2$ of column cross-sectional area.

In the elution, the major part of the neomycin C is first eluted in a discrete band. Following the elution of the neomycin C, which is preferentially eluted by water, there is eluted a small amount of a mixture of neomycins B and C. The next major fraction to be eluted is the desired neomycin B, the major portion of which is eluted in a volume corresponding to approximately 50% of the resin volume. Eluate fractions are collected corresponding to about $\frac{1}{10}$ of the resin volume. In this way, the presence of neomycin B or C may be detected in appropriate fractions, these fractions then being combined for further concentration of the separated components.

The course of the elution is easily followed by observing the optical rotation exhibited by the eluate fractions. The optical rotation of neomycin B sulfate is reported as $[\alpha]_D+56°$, and of neomycin C sulfate $[\alpha]_D+82°$. Thus, as the elution progresses, the optical rotation increases to a maximum as the first neomycin component is eluted, and then passes through a minimum following the elution of neomycin C as a small portion of the mixture of neomycin C and B is eluted, and then again passes through a maximum as the major portion of the neomycin B component is eluted. The course of the elution may also be followed by use of biological assays or, for example, the chemical method of J. D. Dutcher et al., Antibiotics & Chemotherapy, 3, 534 (1953). This method involves heating a solution of neomycin with 40% sulfuric acid for 1½ hours and determination of the furfural thus formed by measurement of the intensity of the absorption maximum at 280 m$\mu$. At the optimum elution rate, i.e., approximately 1.2 ml. per minute per cm.$^2$ of column cross-section, the average concentration of the fractions containing major portions of the individual components is slightly less than 1% by weight of total solids. Although it is possible to concentrate these eluate fractions by evaporation under reduced pressure, a much simpler and a preferred procedure is carried out whereby the eluate fractions rich in neomycin B are readsorbed on a column of IRC-50 resin on the ammonium cycle. By this method, an 8- to 10-fold increase in the concentration of the neomycin component is attained at a loading of about 140 grams of neomycin base per liter of IRC-50 resin. The IRC-50 column may then be eluted with ammonia and the eluate concentrated to a concentration of about 250 grams of neomycin base per liter of solution. The eluate concentrate is then acidified to pH 6.5 with sulfuric acid and neomycin sulfate precipitated by its addition to approximately 5 volumes of methanol. The resulting precipitate of neomycin B sulfate is filtered, washed with methanol, and dried.

The following example is presented to illustrate the method of carrying out the present invention.

*Example 1*

A chromatographic column is prepared containing 3178 ml. of Dowex 1-X2 (50-100 mesh) on the hydroxide cycle. The column has a diameter of 2 inches, which results in a depth of approximately 62 inches of resin contained in the column. After washing the resin carefully with water, the column is drained to the surface of the resin and 230 ml. of an aqueous concentrate of a mixture of neomycins B and C obtained by the resin absorption of neomycin from a neomycin broth containing approximately 58 grams of neomycin base in 230 ml. of solution is applied carefully to the top of the column. The column is slowly drained to the surface of the resin bed, following which two 100 ml. and one 250 ml. portions of distilled water are applied, the column being drained to the top of the resin bed after each addition of water. Development of the chromatogram is then begun under a constant head of distilled water while draining the column steadily at a rate of 22-25 ml. per minute. Eluate fractions are collected at 10-minute intervals corresponding to 220 to 250 ml. fractions, and the optical rotation of each eluate fraction determined. The neomycin C is eluted first in approximately 1½ resin volumes of solution. Following elution of the neomycin C, a mixed fraction of neomycins B and C is collected, equivalent to about 0.25 to 0.40 resin volumes. Following this, the neomycin B is eluted in approximately 0.4 to 0.6 resin volumes. The neomycin B fractions are combined and acidified with 25% sulfuric acid to a pH of 6.5. The resulting solution containing neomycin sulfate is passed over a column of IRC-50 resin on the ammonium cycle at a rate of 16 ml. per minute per liter of resin. The column is then washed free of sulfate ion and the neomycin eluted by passage of 1.0N ammonia water over the column at a rate of 16 ml. per minute per liter of resin. The column eluate containing neomycin base in solution is concentrated in vacuo at a temperature below 40° C. to a concentration of approximately 250 grams per liter. The concentrate is then acidified to pH 6.5 with 25% sulfuric acid. The acidified concentrate containing neomycin B sulfate is isolated as a solid by either lyophilization or precipitation in methanol. The following table shows the course of the elution of neomycin C and neomycin B from the Dowex column, the presence of the neomycins being determined by measurement of the optical rotation of the solution.

TABLE A.—NEOMYCIN CHROMATOGRAPHY

| Eluate Fraction | Cumulative Volume, ml. | Actual Observed Rotation, degrees |
|---|---|---|
| 1 | 225 | .05 |
| 5 | 1,129 | .18 |
| 10 | 2,259 | 1.77 |
| 13 | 2,939 | 2.33 |
| 16 | 3,622 | 1.05 |
| 18 | 4,072 | .42 |
| 21 | 4,747 | 1.47 |
| 23 | 5,197 | 1.75 |
| 27 | 6,110 | 1.13 |
| 30 | 6,800 | .8 |
| 35 | 7,947 | .37 |
| 40 | 9,082 | .17 |
| 45 | 10,222 | .1 |

The material collected through cut 16 is predominantly neomycin C, as shown by paper chromatography. From cut 17 through cut 20 is obtained a mixed fraction which is returned to the process for separation. The product isolated from cut 21 to the end of the chromatography is neomycin B.

Neomycin B sulfate prepared in this manner is substantially free of neomycin C, as determined by a paper chromatography assay described by S. C. Pan and James D. Dutcher, Anal. Chem. 28, 836 (1956).

The purity of the neomycin B sulfate prepared in this manner is further determined by measurement of the following physical constants. Bioassay on the above product gives an assay of 713 mcg. of neomycin base/mg. of neomycin sulfate. The optical rotation measured is $[\alpha]_D +53°$.

Various changes and modifications of the invention can be made, and to the extent that such variations incorporate the spirit of this invention, they are intended to be included within the scope of the appended claims.

What is claimed is:

1. A process for separating neomycin B from aqueous solutions comprising a mixture of neomycin B and neomycin C, which comprises percolating said solution through a chromatographic column containing a quantity of a porous, polystyrene quaternary ammonium exchange resin of fine particle size, having cross linking not exceeding 4%, said resin being on the hydroxyl cycle, and developing said column with an aqueous medium and recovering neomycin B and neomycin C in separate fractions of the resulting eluate.

2. A process according to claim 1 wherein the elutrient is water.

3. A process according to claim 1 wherein the elutrient is aqueous ammonia.

References Cited

Ford, J.A.C.S., vol 77, October 20, 1955, pages 5311 to 5314.

Percival, J. Soc. Cosm. Chems., vol. 13, No. 6, August 1962, pages 291 and 292.

ALBERT T. MEYERS, *Primary Examiner.*

SAM ROSEN, *Examiner.*